(12) United States Patent
Moir et al.

(10) Patent No.: US 8,244,990 B2
(45) Date of Patent: Aug. 14, 2012

(54) OBSTRUCTION-FREE SYNCHRONIZATION FOR SHARED DATA STRUCTURES

(75) Inventors: Mark S. Moir, Somerville, MA (US); Victor M. Luchangco, Arlington, MA (US); Maurice Herlihy, Brookline, MA (US)

(73) Assignee: Oracle America, Inc., Redwood City, CA (US)

( * ) Notice: Subject to any disclaimer, the term of this patent is extended or adjusted under 35 U.S.C. 154(b) by 3548 days.

(21) Appl. No.: 10/620,748

(22) Filed: Jul. 16, 2003

(65) Prior Publication Data

US 2004/0015510 A1 Jan. 22, 2004

Related U.S. Application Data

(60) Provisional application No. 60/396,152, filed on Jul. 16, 2002.

(51) Int. Cl.
 *G06F 12/00* (2006.01)
 *G06F 13/00* (2006.01)
 *G06F 13/28* (2006.01)

(52) U.S. Cl. ....................................................... 711/154

(58) Field of Classification Search .................. 711/168, 711/154
 See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,224,215 A | 6/1993 | Disbrow | |
| 5,319,778 A | 6/1994 | Catino | |
| 5,428,761 A | 6/1995 | Herlihy et al. | |
| 6,128,710 A | 10/2000 | Greenspan et al. | |
| 6,144,965 A | 11/2000 | Olivier | |
| 6,173,373 B1 * | 1/2001 | Bonola ........................ 711/147 |
| 6,178,423 B1 | 1/2001 | Douceur et al. | |
| 6,360,219 B1 | 3/2002 | Bretl et al. | |

(Continued)

FOREIGN PATENT DOCUMENTS

EP 0 366 585 5/1990

(Continued)

OTHER PUBLICATIONS

Agesen, Ole at el., "An Efficient Meta-Lock for Implementing Ubiquitous Synchronization," ACM SIGPLAN Notices, vol. 34, No. 10, pp. 207-222, Oct. 1999.

(Continued)

*Primary Examiner* — Sheng-Jen Tsai
(74) *Attorney, Agent, or Firm* — Robert C. Kowert; Meyertons, Hood, Kivlin, Kowert & Goetzel, P.C.

(57) ABSTRACT

We introduce obstruction-freedom—a new non-blocking condition for shared data structures that weakens the progress requirements of traditional nonblocking conditions, and as a result admits solutions that are significantly simpler and more efficient in the typical case of low contention. We demonstrate the merits of obstruction-freedom by showing how to implement an obstruction-free double-ended queue that has better properties than any previous nonblocking deque implementation of which we are aware. The beauty of obstruction-freedom is that we can modify and experiment with the contention management mechanisms without needing to modify (and therefore reverify) the underlying non-blocking algorithm. In contrast, work on different mechanisms for guaranteeing progress in the context of lock-free and wait-free algorithms has been hampered by the fact that modifications to the "helping" mechanisms has generally required the proofs for the entire algorithm to be done again.

44 Claims, 4 Drawing Sheets

U.S. PATENT DOCUMENTS

| | | | |
|---|---|---|---|
| 6,360,220 | B1 | 3/2002 | Forin |
| 6,366,932 | B1 | 4/2002 | Christenson |
| 6,581,063 | B1 | 6/2003 | Kirkman |
| 6,615,216 | B1* | 9/2003 | Hu ................................. 707/101 |
| 6,651,146 | B1 | 11/2003 | Srinivas et al. |
| 6,826,757 | B2 | 11/2004 | Steele, Jr. et al. |
| 7,000,234 | B1* | 2/2006 | Shavit et al. .................. 719/315 |
| 7,017,160 | B2* | 3/2006 | Martin et al. ................. 719/315 |
| 7,117,502 | B1* | 10/2006 | Harris ........................... 719/315 |
| 2001/0047361 | A1* | 11/2001 | Martin et al. ............. 707/103 R |
| 2001/0056420 | A1* | 12/2001 | Steele et al. ....................... 707/8 |
| 2002/0078123 | A1* | 6/2002 | Latour .......................... 709/104 |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2003/0182465 | A1 | 9/2003 | Moir et al. |
| 2003/0217115 | A1* | 11/2003 | Rowlands ..................... 709/214 |
| 2004/0015642 | A1 | 1/2004 | Moir et al. |
| 2004/0034673 | A1 | 2/2004 | Moir et al. |
| 2004/0153687 | A1 | 8/2004 | Moir et al. |
| 2006/0161737 | A1* | 7/2006 | Martin et al. ................. 711/147 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Anderson, James H. et al., "Universal Constructions for Large Objects," *IEEE Transactions on Parallel and Distributed Systems*, vol. 10, No. 12, pp. 1317-1332, 1999.

Farook, Mohammad et al., "Managing Long Linked Lists Using Lock Free Techniques" in *High Performance Computing Systems and Applications, Chapter 37* (pp. 407-422), Kluwer Academic Publishers, Oct. 1998.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Prakash, Sundeep et al., "Non-Blocking Algorithms for Concurrent Data Structures," Technical Report 91-002, University of Florida, Jul. 1, 1991 [URL: http://citeseer.ist.psu.edu/prakash91nonblocking.html].

Prakash, Sundeep et al., "A Nonblocking Algorithm for Shared Queues Using Compare-and-Swap," *IEEE Transactions on Computers*, vol. 43, No. 5, pp. 548-559, May 1994.

Shann, Chien-Hua et al., "A Practical Nonblocking Queue Algorithm Using Compare-and Swap," *Proceedings of the Seventh International Conference on Parallel and Distributed Systems* p. 470, IEEE Computer Society, Washington, D.C., 2000.

Shavit, N., et al., "Elimination Trees and the Construction of Pools and Stacks," *Theory of Computing Systems*, vol. 30, pp. 645-670, 1997.

Stone, Janice M., "A simple and correct shared-queue algorithm using Compare-and-Swap," *Proceedings of the 1990 ACM/IEEE Conference on Supercomputing*, pp. 495-504, IEEE Computer Society, New York, NY, 1990.

Valois, John D., "Lock-Free Linked Lists Using Compare-and-Swap," *Proceedings of the Fourteenth ACM Symposium on Principles of Distributed Computing*, pp. 214-222, ACM Press, New York, NY 1995.

Afek, Yehuda et al., "Long-Lived Renaming Made Adaptive", 18th Annual ACM Symposium on Principles of Distributed Computing, pp. 91-104, 1999.

Afek, Yehuda, "Wait-Free Made Fast", 27th Annual ACM Symposium on Theory of Computing, pp. 538-547, 1995.

Agesen, Ole et al.,"DCAS-Based Concurrent Deques", 12th Annual ACM Symposium on Parallel Algorithms and Architectures, pp. 137-146, Jul. 2000.

Anderson, James H. et al., "Using Local-Spin k-Exclusion Algorithms to Improve Wait-Free Object Implementations", 12th Annual ACM Symposium on Principles of Distributed Computing, Nov. 1995 (revised 1996, 1997).

Arora, Nimar S. et al., "Thread Scheduling for Multiprogrammed Multiprocessors", 10th Annual ACM Symposium on Parallel Algorithms and Architectures, pp. 119-129, 1998.

Attiya, Hagit et al., "An Adaptive Collect Algorithm with Applications", Dept. of Computing Science, The Technion, Israel, May 10, 2001.

Barnes, Greg, "A Method for Implementing Lock-Free Shared Data Structures", 5th Annual ACM Symposium on Parallel Algorithms and Architectures, pp. 261-270, 1993.

Bayer, R. et al., "Concurrency of Operations on B-Trees", Acta Informatica, 1977.

Detlefs, David L. et al., "Even Better DCAS-Based Concurrent Deques", 14th International Conference on Distributed Computing, pp. 59-73, 2000.

Detlefs, David L. et al., "Lock-Free Reference Counting", 20th Annual ACM Symposium on Principles of Distributed Computing, pp. 190-199, 2001.

Dice, David et al., "Mostly Lock-Free Malloc", ACM 2002.ACM SIGPLAN International Symposium on Memory Management, Jun. 2002.

Greenwald, Michael B., "Non-Blocking Synchronization and System Design", PhD Thesis, Stanford University Technical Report STAN-CS-TR-1624, Palo Alto, California, Aug. 1999.

Herlihy, Maurice, "A Methodology for Implementing Highly Concurrent Data Objects", ACM Transactions on Programming Languages and System, pp. 745-770, Nov. 1993.

Herlihy, Maurice, "Dynamic-Sized Lockfree Data Structures", Sun Microsystems Technical Report SMLI TR-2002-112, Jun. 2002.

Herlihy, Maurice et al., "Linearizability: A Correctness Condition for Concurrent Objects", ACM Transactions on Programming Languages and Systems, pp. 463-492, Jul. 1990.

Herlihy, Maurice et al., "The Repeat Offender Problem: A Mechanism for Supporting Dynamic-Sized Lock-Free Data Structures", Sun Microsystems Technical Report SMLI TR-2002-112, Jun. 2002.

Herlihy, Maurice et al., "Transactional Memory: Architectural Support for Lock-Free Data Structures", 20th International Symposium in Computer Architecture, 1993.

Herlihy, Maurice et al., "Obstruction-Free Synchronization: Double-Ended Queues as an Example", 23rd International Conference on Distributed Computing, May 2003.

Israeli, Amos et al., "Disjoint-Access-Parallel Implementations of Strong Shared Memory Primitives", 13th Annual ACM Symposium on Principles of Distributed Computing, pp. 151-160, 1994.

Lamport, Leslie, "How to Make a Multiprocessor Computer that Correctly Executes Multiprocess Programs", IEEE Transactions on Computers, Sep. 1979.

Luchangco, Victor et al., "Nonblocking k-compare-single-swap", 15th Annual ACM Symposium on Parallel Algorithms and Architectures, Jun. 2003.

Martin, Paul et al.,"DCAS-Based Concurrent Deques Supporting Bulk Allocation", Sun Microsystems, Inc. Technical Report SMI TR-2002-111, Oct. 2002.

Michael, Maged M. et al., "Non-Blocking Algorithms and Preemption-Safe Locking on Multiprogrammed Shared Memory Multiprocessors", Journal of Parallel and Distributed Computing, Mar. 1997.

Michael, Maged M. et al., "Simple, Fast and Practical Non-Blocking and Blocking Concurrent Queue Algorithms", 15th Annual ACM Symposium on Principles of Distributed Computing, pp. 267-276, 1996.

Michael, Maged M., "Safe Memory Reclamation for Dynamic Lock-Free Objects Using Atomic Reads and Writes", 21st Annual ACM Symposium on Principles of Distributed Computing, pp. 21-30, Jan. 2002.

Moir, Mark, "Laziness Pays! Using Lazy Synchronization Mechanisms to Improve Non-Blocking Constructions", 19th Annual ACM Symposium on Principles of Distributed Computing, 2000.

Moir, Mark, "Practical Implementations of Non-Blocking Synchronization Primitives", 16th Annual ACM Symposium on Principles of Distributed Computing, 1997.

Moir, Mark, "*Transparent Support for Wait-Free Transactions*", 11th International Workshop on Distributed Algorithms, 1997.

Moir, Mark et al., "*Wait-Free Algorithms for Fast, Long-Lived Renaming*", Science of Computer Programming, Aug. 1994.

Saks, Michael et al., "*Optimal Time Randomized Consensus—Making Resilient Algorithms Fast in Practice*", 2nd ACM SIAM Symposium on Discrete Algorithms, pp. 351-362, 1991.

Shavit, Nir et al., "*Software Transactional Memory*", Distributed Computing, Special Issue (10), 1997.

Trieber, R, "*Systems Programming: Coping with Parallelism*", IBM Technical Report RJ5118, Apr. 23, 1986.

Turek, John et al., "*Locking without Blocking: Making Lock Based Concurrent Data Structure Algorithms Nonblocking*", 11th ACM SIGACT-SIGMOD-SIGART Symposium on Principles of Database Systems, 1992.

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

Herlihy, M.P., "Wait-Free Synchronization," *ACM Transactions on Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations for Non-Blocking Concurrent Objects," *Proceedings 13th IEEE International Conference on Distributed Computing Systems*, pp. 264-273. IEEE Computer Society Press, Washington, D.C., 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Attiya, Hagit, et al., "Atomic Snapshots in O(n log n) Operations," *SIAM Journal on Computing*, 27(2):319-340, Apr. 1998.

\* cited by examiner

OBSTRUCTION-FREE SYNCHRONIZATION FOR SHARED DATA STRUCTURES

CROSS-REFERENCE TO RELATED APPLICATION(S)

This application claims priority, under 35 U.S.C. §119(e), of U.S. Provisional Application No. 60/396,152, filed Jul. 16, 2002, naming Mark Moir, Victor Luchangco and Maurice Herlihy as inventors.

BACKGROUND

1. Field of the Invention

The present invention relates generally to coordination amongst execution sequences in a multiprocessor computer, and more particularly, to structures and techniques for facilitating nonblocking implementations of shared data structures.

2. Description of the Related Art

A traditional way to implement shared data structures is to use mutual exclusion (locks) to ensure that concurrent operations do not interfere with one another. However, locking has a number of disadvantages with respect to software engineering, fault-tolerance, and scalability. As a result, researchers have investigated a variety of alternative nonblocking synchronization techniques that do not employ mutual exclusion. A synchronization technique is said to be wait-free if it ensures that every thread will continue to make progress in the face of arbitrary delay (or even failure) of other threads. It is said to be lock-free if it ensures only that some thread always makes progress. While wait-free synchronization is the ideal behavior (thread starvation is unacceptable), lock-free synchronization is often good enough for practical purposes (as long as starvation, while possible in principle, never happens in practice).

In the hands of a highly skilled programmer, the synchronization primitives provided by many modern processor architectures, such as compare-and-swap (CAS) operations or load-locked/store-conditional (LL/SC) operation pairs, are typically powerful enough to achieve wait-free (or lock-free) implementations of a linearizable data object. Nevertheless, with a few exceptions, wait-free and lock-free data structures are rarely used in practice. The underlying problem is that conventional synchronization primitives such as CAS and LL/SC are an awkward match for lock-free synchronization. These primitives lend themselves most naturally to optimistic synchronization, which guarantees progress only in the absence of synchronization conflicts. For example, the natural way to use CAS for synchronization is to read a value v from an address a, perform a multistep computation to derive a new value w, and then to call CAS to reset the value of a from v to w. The CAS is successful if the value at a has not been changed in the meantime. Progress guarantees typically rely on complex and computationally expensive "helping" mechanisms that pose a substantial barrier to the wider use of lock-free synchronization.

Accordingly, alternative techniques are desired whereby these complexities and related computational expense may be avoided or reduced. In this way, nonblocking shared data objects may achieve wider adoption and use.

SUMMARY

We propose an alternative nonblocking condition that we believe will, in practice, lead to simple, efficient non-blocking implementations of shared data structures and associated algorithms. Our techniques build on the concept of obstruction-freedom. A synchronization technique is obstruction-free if it guarantees progress for any thread that eventually executes in isolation. Even though other threads may be in the midst of executing operations, a thread is considered to execute in isolation as long as the other threads do not take any steps. Pragmatically, it is enough for the thread to run long enough without encountering a synchronization conflict from a concurrent thread. Like the wait-free and lock-free conditions, obstruction-free synchronization ensures that no thread can be blocked by delays or failures of other threads. This property is weaker than lock-free synchronization, because it does not guarantee progress when two or more conflicting threads are executing concurrently.

A somewhat unconventional aspect of our approach of implementing obstruction-free algorithms (which differs from the usual approach of implementing their lock-free and wait-free counterparts) is that we think that progress should be considered a problem of engineering, not of mathematics. We believe that conventional approaches which tend to commingle correctness and progress have inadvertently resulted in unnecessarily inefficient and conceptually complex algorithms, creating a barrier to widespread acceptance of non-blocking forms of synchronization. We believe that a clean separation between the two concerns promises simpler, more efficient, and more effective algorithms.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
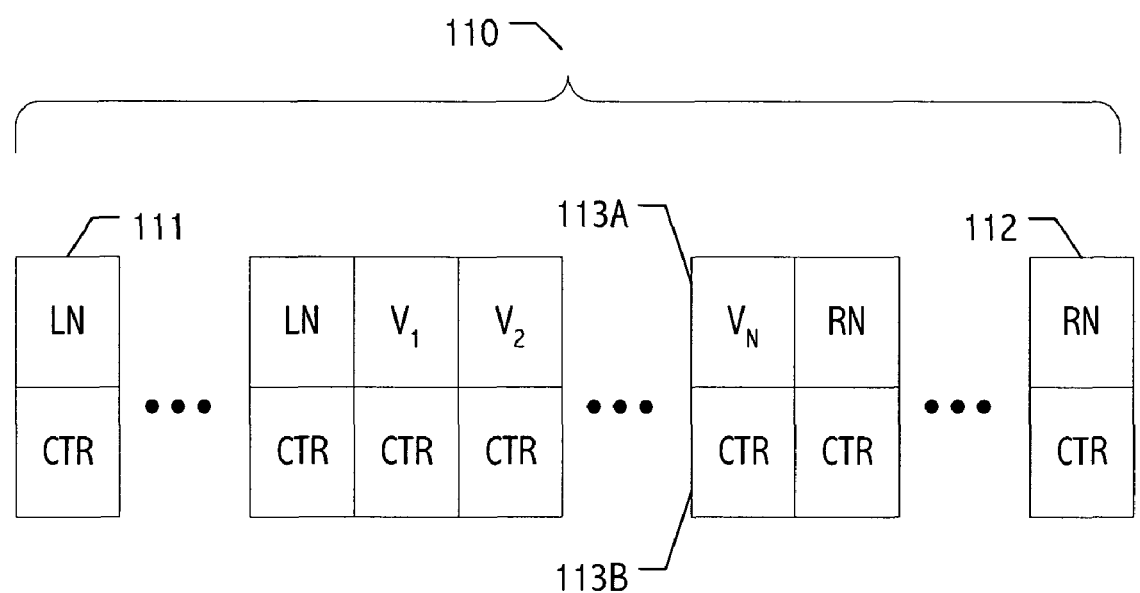
FIG. 1 depicts an illustrative state of an array-based encoding of a shared data structure that serves as a context for explaining some techniques in accordance with the present invention.

To illustrate the power of our obstruction-free approach, we have implemented a nonblocking double-ended queue (i.e., a deque). Deques are more formally defined below. However, informally, deques generalize FIFO queues and LIFO stacks by supporting a sequence of values and operations for adding (pushing) a value to or removing (popping) a value from either end. Thus, implementing a shared deque combines the intricacies of implementing queues and stacks.

Using our techniques, we believe that we have achieved the first fully-functional, single-target synchronization based (e.g., CAS-based), non-blocking deque implementation in which opposing end operations do not always interfere. To contrast our results with that of others, we briefly summarize related work on nonblocking deques.

Arora, et al. proposed a limited-functionality CAS-based lock-free deque implementation (See N. S. Arora, B. Blumofe, and C. G. Plaxton, *Thread Scheduling for Multiprogrammed Multiprocessors*, In Proceedings of the 10th Annual ACM Symposium on Parallel Algorithms and Architectures, pp. 119-129 (1998)). Their deque allows only one process to access one end, and only pop operations to be done on the other. Thus, they did not face the difficult problem of concurrent pushes and pops on the same end of the deque. They further simplified the problem by allowing some concurrent operations to simply abort and report failure.

Greenwald proposed two lock-free deque implementations. See M. Greenwald. *Non-Blocking Synchronization and System Design*, PhD thesis, Stanford University Technical Report STAN-CS-TR-99-1624, Palo Alto, Calif., August 1999. Both implementations depend on a hardware DCAS (double compare-and-swap) instruction, which is not widely supported in practice, and one of them does not support noninterfering concurrent operations at opposite ends of the deque.

Michael proposed a simple and efficient lock-free, CAS-based deque implementation. See M. Michael, *Dynamic Lock-Free Deques Using Single Address, Double-Word CAS*, Technical report, IBM T J Watson Research Center, January 2002. However, the technique used by Michael's proposed algorithm fundamentally causes all operations to interfere with each other. Therefore, it offers no insight into designing scalable nonblocking data structures in which noninterfering operations can proceed in parallel.

Obstruction-Free Implementations

We now introduce obstruction-freedom, a new nonblocking property for shared data structure implementations. This property is strong enough to avoid the problems associated with locks, but it is weaker than previous nonblocking properties—specifically lock-freedom and wait-freedom—allowing greater flexibility in the design of efficient implementations. Obstruction-freedom admits substantially simpler implementations, and we believe that in practice it can provide the benefits of wait-free and lock-free implementations. To illustrate the benefits of obstruction-freedom, we present two obstruction-free CAS-based implementations of double-ended queues (deques); the first is implemented on a linear array, the second on a circular array. To our knowledge, all previous nonblocking deque implementations (i) have been based on unrealistic assumptions about hardware support for synchronization, (ii) have restricted functionality and/or (iii) have operations that interfere with operations at the opposite end of the deque even when the deque has many elements in it. Our obstruction-free implementations exhibit none of these drawbacks. While this is an important achievement in and of itself, the simplicity of our implementations tends to suggest that it is much easier to design obstruction-free implementations than lock-free and wait-free ones.

Because obstruction-freedom does not guarantee progress in the presence of contention, we need to provide some mechanism to reduce the contention so that progress is achieved. However, lock-free and wait-free implementations typically also require such mechanisms to get satisfactory performance. We can use these same or similar mechanisms with obstruction-free implementations, as we discuss below. Because obstruction-freedom guarantees safety regardless of the contention, we can change mechanisms, even dynamically, without changing the underlying nonblocking implementation.

One simple and well-known method to reduce contention is for operations to "back off" when they encounter interference by waiting for some time before retrying. Various choices are possible for how long to wait. For example, randomized exponential backoff is one scheme that is effective in many contexts. Other approaches to reducing contention include queuing and timestamping approaches, in which threads agree amongst themselves to "wait" for each other to finish. While a simplistic applications of these ideas could give rise to some of the same problems that the use of locks does, we have much more freedom in designing sophisticated approaches for contention control than when using locks, because correctness is not jeopardized by interrupting an operation at any time and allowing another operation to continue execution.

In fact, it is possible to design contention management mechanisms that guarantee progress to every operation that takes enough steps, provided the system satisfies some very weak (and reasonable) assumptions. Thus, the strong progress properties of wait-free implementations can be achieved in practice by combining obstruction-free implementations with appropriate contention managers. In scenarios in which contention between operations is rare, we will benefit from the simple and efficient obstruction-free designs; the more heavy-weight contention resolution mechanisms will rarely be invoked. In contrast, in most lock-free and wait-free implementations, the mechanisms that are used to ensure the respective progress properties impose significant overhead even in the absence of contention.

In some contexts, explicit contention reduction mechanisms may even be unnecessary. For example, in a uniprocessor where threads are scheduled by time slice, relatively short obstruction-free operations will be guaranteed to run alone for long enough to complete. Similarly, in priority-scheduled uniprocessors, an operation runs in isolation unless it is preempted by a higher priority operation.

A Double-ended Queue (Deque)

A deque object S is a concurrent shared object, that in an exemplary realization is created by an operation of a constructor operation, e.g., make_deque( ), and which allows each processor $P_i$, $0 \leq i \leq n-1$, of a concurrent system to perform the following types of operations on S: push_right$_i$(v), push_left$_i$(v), pop_right$_i$( ), and pop_left$_i$( ). Each push operation has an input, v, where v is selected from a range of values. Each pop operation returns an output from the range of values. Push operations on a full deque object and pop operations on an empty deque object return appropriate indications.

A concurrent implementation of a deque object is one that is linearizable to a standard sequential deque. This sequential deque can be specified using a state-machine representation that captures all of its allowable sequential histories. These sequential histories include all sequences of push and pop operations induced by the state machine representation, but do not include the actual states of the machine. In the following description, we abuse notation slightly for the sake of clarity.

The state of a deque is a sequence of items $S = \langle v_0, \ldots, v_k \rangle$ from the range of values, having cardinality $0 \leq |S| \leq \text{max\_length\_S}$. The deque is initially in the empty state (following invocation of make_deque( )), that is, has cardinality 0, and is said to have reached a full state if its cardinality is max_length_s.

The four possible push and pop operations, executed sequentially, induce the following state transitions of the sequence $S = \langle v_0, \ldots, v_k \rangle$, with appropriate returned values:

| | |
|---|---|
| push_right ($v_{new}$) | if S is not full, sets S to be the sequence S = ($v_0$, ..., $v_k$, $v_{new}$) |
| push_left ($v_{new}$) | if S is not full, sets S to be the sequence S = ($v_{new}$, ..., $v_0$, $v_k$) |
| pop_right () | if S is not empty, sets S to be the sequence S = ($v_0$, ..., $v_{k-1}$) and returns the item, $v_k$. |
| pop_left () | if S is not empty, sets S to be the sequence S = ($v_1$, ..., $v_k$) and returns the item $v_0$. |

For example, starting with an empty deque state, S=<>, the following sequence of operations and corresponding transitions can occur. A push_right (1) changes the deque state to S=<1>. A push_left (2) subsequently changes the deque state to S=<2,1>. A subsequent push_right (3) changes the deque state to S=<2,1,3>. Finally, a subsequent pop_right( ) changes the deque state to S=<2,1> and returns the value, 3. In some implementations, return values may be employed to indicate success or failure.

Obstruction-Free Deque Implementation

We present an array-based, obstruction-free deque implementation. Our first algorithm is extremely simple, and serves to illustrate our technique. However, the first illustration is not entirely complete in the sense that it does not fully generalize queues. In particular, if we only push on one end and pop from the other, we will exhaust the space in the illustrated array and will not be able to push any more items. Later, we show how to extend the algorithm to "wrap around" in the array in order to overcome this problem.

The declarations that follow define a simple array-based data structure that encodes our deque.

```
type element = record val: valtype; ctr: int end
A: array [0 .. MAX+1] of element initially there is some k in
[0, MAX] such that A[i] = <LN, 0> for all i in [0, k] and
A[i] = <RN, 0> for all i in [k+1, MAX+1].
```

In our implementation, we assume the existence of two special "null" values LN and RN (left null and right null) that are never pushed onto the deque. We use the array A to store the current state of the deque. The deque can contain up to MAX values, and the array is of size MAX+2 to accommodate a left-most location that always contains LN and a right-most location that always contains RN. These extra locations are not strictly necessary, but they simplify the code.

FIG. 1 illustrates such an array 110, where values $v_1$, $v_2$, ... $v_n$ of a represented deque are encoded in elements of the array. An LN value is stored in a leftmost array element 111 and in each other element to the left of $v_1$. An RN value is stored in a rightmost array element 112 and in each other element to the right of $v_n$. Each element of the array includes two fields, e.g., a val field such as 113A and a ctr field such as 113B. Operations on the encoded values and on fields of the elements will be understood with reference to FIG. 1 and to the exemplary code herein.

Our algorithm maintains the invariant that the sequence of values in A[0].val . . . A[MAX+1].val always includes of at least one LN, followed by zero or more data values, followed by at least one RN. The array can be initialized any way that satisfies this invariant. To simplify our presentation, we assume the existence of a function oracle( ), which accepts a parameter left or right and returns an array index. The intuition is that this function attempts to return the index of the leftmost RN value in A when invoked with the parameter right, and attempts to return the index of the rightmost LN value in A when invoked with the parameter left. The algorithm is linearizable even if oracle can be incorrect. We assume that oracle( ) always returns a value between 1 and MAX+1, inclusive, when invoked with the parameter right and always returns a value between 0 and MAX, inclusive, when invoked with the parameter left. Clearly, it is trivial to implement a function that satisfies this property. Stronger properties of the oracle are required to prove obstruction-freedom; we discuss these properties and how they can be achieved later.

As explained in more detail below, we employ version numbers to each value in order to prevent concurrent operations that potentially interfere from doing so. The version numbers are updated atomically with the values using a compare-and-swap (CAS) instruction. In general, a CAS (a, e, n) operation or instruction takes three parameters: an address a, an expected value e, and a new value n. If the value currently stored at address a matches the expected value e, then the CAS stores the new value n at address a and returns true; we say that the CAS succeeds in this case. Otherwise, the CAS returns false and does not modify the memory. We say that the CAS fails in this case. As usual with version numbers, we assume that sufficient bits are allocated for the version numbers to ensure that they cannot "wrap around" during the short interval in which one process executes a single iteration of a short loop in our algorithm.

A reason our obstruction-free deque implementation is so simple, and the reason we believe obstruction-free implementations in general will be significantly simpler than their lock-free and wait-free counterparts, is that there is no progress requirement when interference is detected. Thus, provided we maintain basic invariants, we can simply retry when we detect interference. In our deque implementation, data values are changed only at the linearization point of successful push and pop operations. To detect when concurrent operations interfere with each other, we increment version numbers of adjacent locations (without changing their associated data values). As a result of this technique, two concurrent operations can each cause the other to retry: this explains why our implementation is so simple, and also why it is not lock-free.

To make this idea more concrete, we describe our implementation in terms of right-side push and pop operations (rightpush( ) and rightpop( )) that appear below. Left-side operations are symmetric with the right-side ones. As a result, they are not separately described.

```
rightpush(v)                        // v is not RN or LN
RH0: while (true) {
RH1:    k := oracle(right);         // find index of leftmost RN
RH2:    prev := A[k-1];             // read (supposed) rightmost non-RN
                                    // value
RH3:    cur := A[k];                // read (supposed) leftmost RN value
RH4:    if (prev.val != RN and cur.val = RN)  { // oracle is right
RH5:       if (k = MAX+1) return "full";   // A[MAX] != RN
RH6:       if CAS(&A[k-1],prev,<prev.val,prev.ctr+1>)   // try to
                                                        // bump up
                                                        // prev.ctr
RH7:          if CAS(&A[k],cur,<v,cur.ctr+1>)   // try to push new
                                                // value
RH8:             return "ok";       // it worked!
        }
    }
}
```

Figure 2:
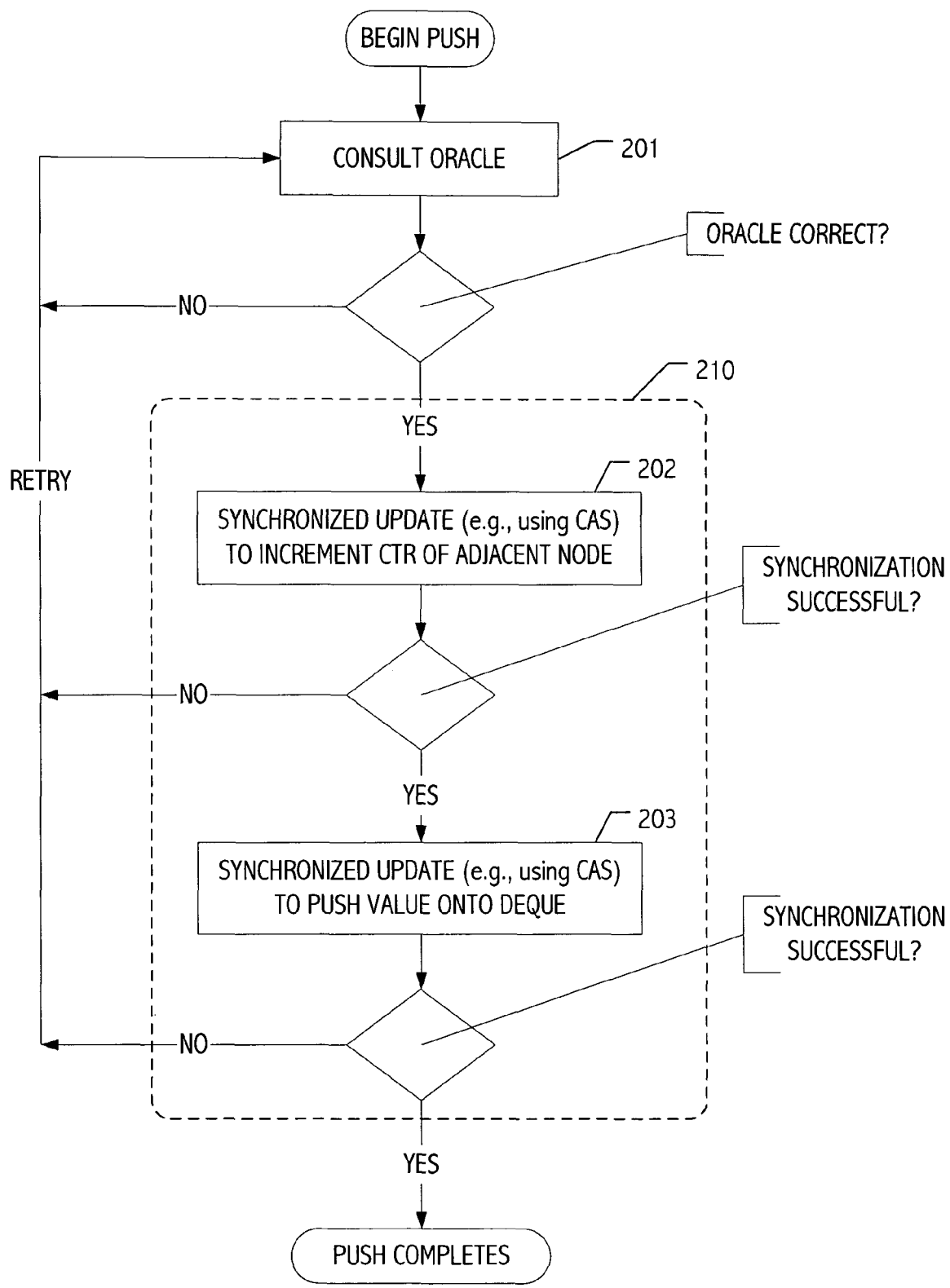
FIG. 2 illustrates a flow for an illustrative obstruction-free push operation in accordance with some techniques of the present invention.

FIG. 2 highlights the simplicity of our implementation. After consulting (201) an oracle (described below), the rightpush( ) implementation employs a pair of single-target synchronizations to increment (202) the ctr field of an adjacent element and, if successful, to push (203) a value onto the deque. Interference with a competing operation simply results in a retry.

The rightpop( ) operation is also quite straightforward and will be understood with reference to the following code.

```
rightpop()
RP0: while (true) {      // keep trying till return val or empty
RP1:    k := oracle(right);        // find index of leftmost RN
RP2:    cur := A[k-1];             // read (supposed) value to be popped
RP3:    next := A[k];              // read (supposed) leftmost RN
RP4:    if (cur.val != RN and next.val = RN) {   // oracle is right
RP5:        if (cur.val = LN and A[k-1] = cur);  // adjacent LN and RN
RP6:            return "empty"
RP7:        if CAS(&A[k],next,<RN,next.ctr+1>)   // try to bump up
                                                 // next.ctr
RP8:        if CAS(&A[k-1],cur,<RN,cur.ctr+1>)   // try to remove
value
RP9:            return cur.val     // it worked; return removed value
        }
    }
```

The basic idea behind our algorithm is that a rightpush(v) operation changes the leftmost RN value to v, and a rightpop( ) operation changes the rightmost data value to RN and returns that value. Each rightpush(v) operation that successfully pushes a data value (as opposed to returning "full") is linearized to the point at which it changes an RN value to v. Similarly, each rightpop( ) operation that returns a value v (as opposed to returning "empty") is linearized to the point at which it changes the val field of some array location from v to RN. Furthermore, the val field of an array location does not change unless an operation is linearized as discussed above. The rightpush( ) operation returns "full" only if it observes a non-RN value in A [MAX].val. Given these observations, it is easy to see that our algorithm is linearizable if we believe the following three claims (and their symmetric counterparts):

At the moment that line RH7 of a rightpush (v) operation successfully changes A [k] .val for some k from RN to v, A [k−1] .val contains a non-RN value (i.e., either a data value or LN).
At the moment that line RP8 of the rightpop () operation successfully changes A [k−1] .val for some k from some value v to RN, A [k] .val contains RN.
If a rightpop () operation returns "empty", then at the moment it executed line RP3, A[k] .val=RN and A [k−1] .val=LN held for some k.

Using the above observations and claims, a proof by simulation to an abstract deque in an array of size MAX is straightforward. Below we briefly explain the synchronization techniques that we use to ensure that the above claims hold. The techniques all exploit the version numbers in the array locations.

The empty case (the third claim above) is the simplest: rightpop( ) returns "empty" only if it reads the same value from A [k−1] at lines RP2 and RP5. Because every CAS that modifies an array location increments that location's version number, it follows that A[k−1] maintained the same value throughout this interval (recall our assumption about version numbers not wrapping around). Thus, in particular, A [k−1]. val contained LN at the moment that line RP3 read RN in A[k].val.

The techniques used to guarantee the other two claims are essentially the same, so we explain only the first one. The basic idea is to check that the neighboring location (i.e., A [k−1]) contains the appropriate value (line RH2; see also line RH4), and to increment its version number (without changing its value; line RH6) between reading the location to be changed (line RH3) and attempting to change it (line RH7). If any of the attempts to change a location fail, then we have encountered some interference, so we can simply restart. Otherwise, it can be shown easily that the neighboring location did not change to RN between the time it was read (line RH2) and the time the location to be changed is changed (line RH7). The reason is that a rightpop( ) operation—the only operation that changes locations to RN—that was attempting to change the neighboring location to RN would increment the version number of the location the rightpush( ) operation is trying to modify, so one of the operations would cause the other to retry.

Oracle Implementations

The requirements for the oracle( ) function assumed in the previous section are quite weak, and therefore a number of implementations are possible. We first describe the requirements, and then outline some possible implementations. For linearizability, the only requirement on the oracle is that it always returns an index from the appropriate range depending on its parameter as stated earlier; satisfying this requirement is trivial. However, to guarantee obstruction-freedom, we require that the oracle is eventually accurate if repeatedly invoked in the absence of interference. By "accurate": we mean that it returns the index of the leftmost RN when invoked with right, and the index of the rightmost LN when invoked with left. It is easy to see that if any of the operations executes an entire loop iteration in isolation, and the oracle function returns the index specified above, then the operation completes in that iteration. Because the oracle has no obligation (except for the trivial range constraint) in the case that it encounters interference, we have plenty of flexibility in implementing it. One simple and correct implementation is to search the array linearly from one end looking for the appropriate value. Depending on the maximum deque size, however, this solution might be very inefficient. One can imagine several alternatives to avoid this exhaustive search. For example, we can maintain "hints" for the left and right ends, with the goal of keeping the hints approximately accurate; then we could read those hints, and search from the indicated array position (we'll always be able to tell which direction to search using the values we read). Because these hints do not have to be perfectly accurate at all times, we can choose various ways to update them. For example, if we use CAS to update the hints, we can prevent slow processes from writing out-of-date values to hints, and therefore keep hints almost accurate all the time. It may also be useful to loosen the accuracy of the hints, thereby synchronizing on them less often. In particular, we might consider only updating the hint when it is pointing to a location that resides in a different cache line than the location that really contains the leftmost RN for example, as in this case the cost of the inaccurate hint would be much higher.

Extension to Circular Arrays

Figure 3:
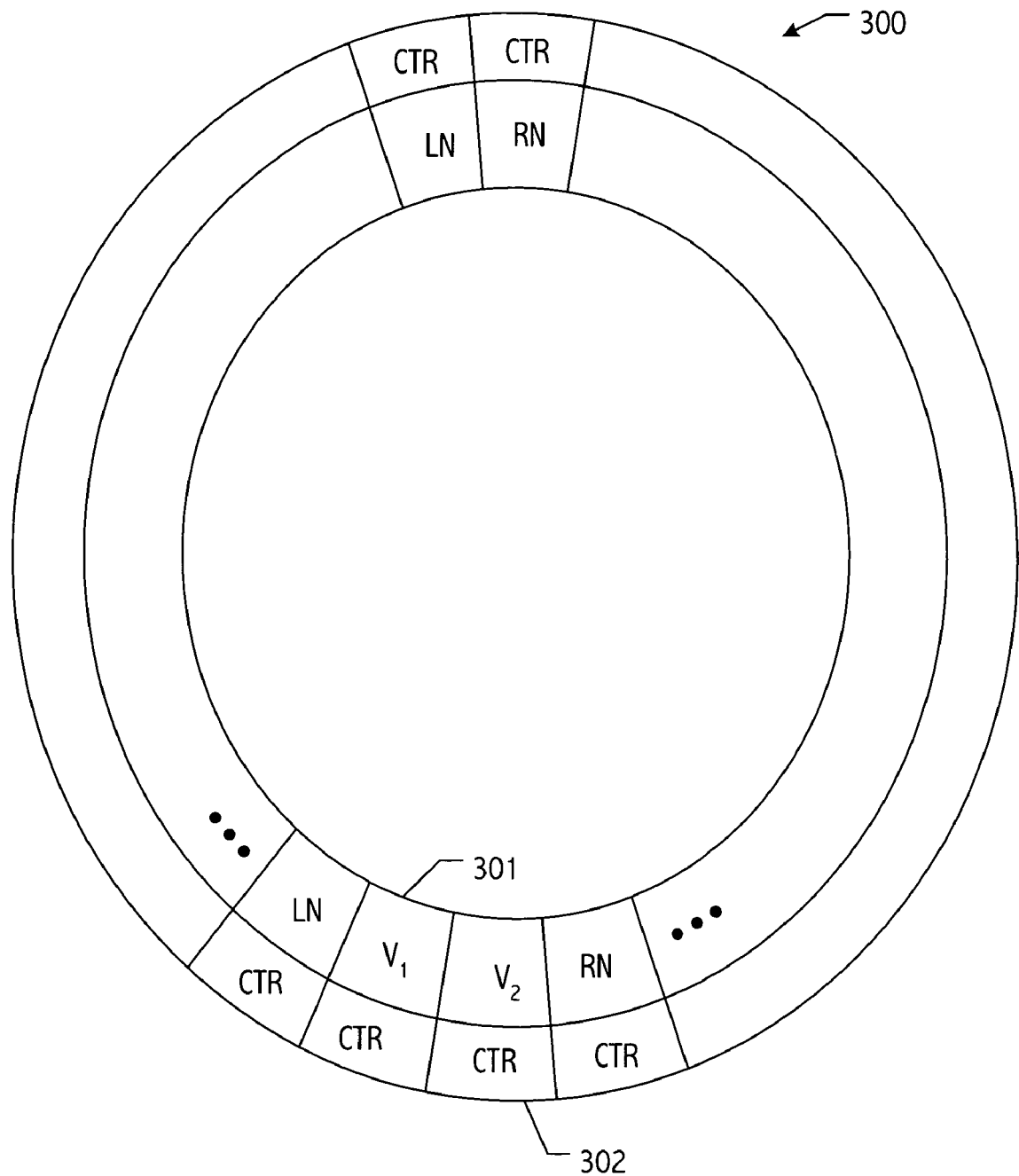
FIG. 3 depicts an illustrative state of a circular array-based encoding of a shared data structure encoding for an exemplary non-blocking deque implemented in accordance with some embodiments of the present invention.

In this section, we show how to extend the algorithm in the previous section to allow the deque to "wrap around" the array, so that the array appears to be circular. FIG. 3 illustrates a two-value deque state encoded in a suitable circular array (300), where elements 301 and 302 encode values $v_1$ and $v_2$, respectively. In other words, A [0] is "immediately to the right" of A [MAX+1]. As before, we maintain at least two null entries in the array: we use the array A [0 . . . MAX+1] for a deque with at most MAX elements. The array can be initialized arbitrarily provided it satisfies the main invariant for the algorithm, stated below. One option is to use the initial conditions for the algorithm in the previous section.

We now describe the new aspects of the algorithm. Code for the right-side operations of the wrap-around deque implementation are shown below. As before, the left-side operations are symmetric, and we do not discuss them further except as they interact with the right-side operations. All arithmetic on array indices is done modulo MAX+2.

```
rightpush (v)                                      // ! v in {LN, RN, DN})
RH0: while (true) {
RH1:     k,prev,cur := rightcheckedoracle();       // cur.val = RN and
                                                   // prev.val != RN.
RH2:       next := A[k+1];
RH3:       if (next.val = RN)
RH4:         if CAS(&A[k−1], prev, <prev.val, prev.ctr+1>)
RH5:           if CAS(&A[k], cur, <v, cur.ctr+1>)          // RN -> v
RH6:             return "ok";
RH7:       if (next.val = LN)
RH8:         if CAS(&A[k], cur, <RN, cur.ctr+1>)
RH9:           CAS(&A[k−1], next, <DN, next.ctr+1>);   // LN -> DN
RH10:      if (next.val = DN) {
RH11:        nextnext := A[k+2];
RH12:        if !(nextnext.val in {RN,LN,DN})
RH13:          if (A[k−1] = prev)
RH14:            if (A[k] = cur) return "full";
RH15:        if (nextnext.val = LN)
RH16:          if CAS(&A[k+2], nextnext, <nextnext.val,nextnext.ctr+1>)
RH17:            CAS(&A[k+1], next, <RN, next.ctr+1>);   // DN -> RN
         }
}
rightpop ()
RP0: while (true) {
RP1:     k,cur,next := rightcheckedoracle();    // next.val = RN and
                                                // cur.val != RN
RP2:     if (cur.val in {LN,DN} and A[k−1] = cur)   // depends on order
                                                   // of RO2 & RO3.
RP3:       return "empty";
RP4:     if CAS(&A[k],next,<RN,next.ctr+1>)
RP5:       if CAS(&A[k−1],cur,<RN,cur.ctr+1>)      // v -> RN
RP6:         return cur.val;
     }
```

There are two main differences between this algorithm and the one in the previous section. First, it is more difficult to tell whether the deque is fill; we must determine that there are exactly two null entries. Second, rightpush( ) operations may encounter LN values as they "consume" the RN values and wrap around the array (similarly, leftpush( ) operations may encounter RN values). We handle this second problem by enabling a rightpush( ) operation to "convert" LN values into RN values. This conversion uses an extra null value, which we denote DN, for "dummy null". We assume that LN, RN and DN are never pushed onto the deque.

Because the array is circular, the algorithm maintains the following invariants instead of the simpler invariant maintained by the algorithm in the previous section:

All null values are in a contiguous sequence of locations in the array. (Recall that the array is circular, so the sequence can wrap around the array.)

The sequence of null values consists of zero or more RN values, followed by zero or one DN value, followed by zero or more LN values.

There are at least two different types of null values in the sequence of null values.

Thus, there is always at least one LN or DN entry, and at least one RN or DN entry.

Instead of invoking oracle (right) directly, the push and pop operations invoke a new auxiliary procedure, rightcheckedoracle ( ). In addition to an array index k, right checkedoracle ( ) returns left and right, the contents it last saw in A[k−1] and A[k] respectively. It guarantees that right.val=RN and that left.val!=RN. Thus, if rightcheckedoracle ( ) runs in isolation, it always returns the correct index, together with contents of the appropriate array entries that prove that the index is correct. If no RN entry exists, then by the third invariant above, there is a DN entry and an LN entry; rightcheckedoracle ( ) attempts to convert the DN into an RN before returning.

```
rightcheckedoracle ()
// Returns k,left,right, where left = A[k−1] at some time t,
// and right = A[k] at some time t' > t during the execution,
// with left.val != RN and right.val = RN.
RO0: while (true) {
RO1:     k := oracle(right);
RO2:     left := A[k−1];                     // order important for check
RO3:     right := A[k];                      // for empty in rightpop
RO4:     if (right.val = RN and left.val != RN)   // correct oracle
RO5:       return k,left,right;
RO6:     if (right.val = DN and ! (left.val in {RN,DN}))   // correct oracle,
                                                           // but no RNs
RO7:       if CAS(&A[k−1], left, <left.val,left.ctr+1>)
RO8:         if CAS(&A[k], right, <RN,right.ctr+1>)        // DN -> RN
RO9:           return k,<left.val,left.ctr+1>,<RN,right.ctr+1>;
     }
```

Other than calling rightcheckedoracle ( ) instead of oracle (right), which also eliminates the need to read and check the cur and next values again, the only change in the rightpop( ) operation is that, in checking whether the deque is empty, cur.val may be either LN or DN, because there may be no LN entries.

Figure 4:
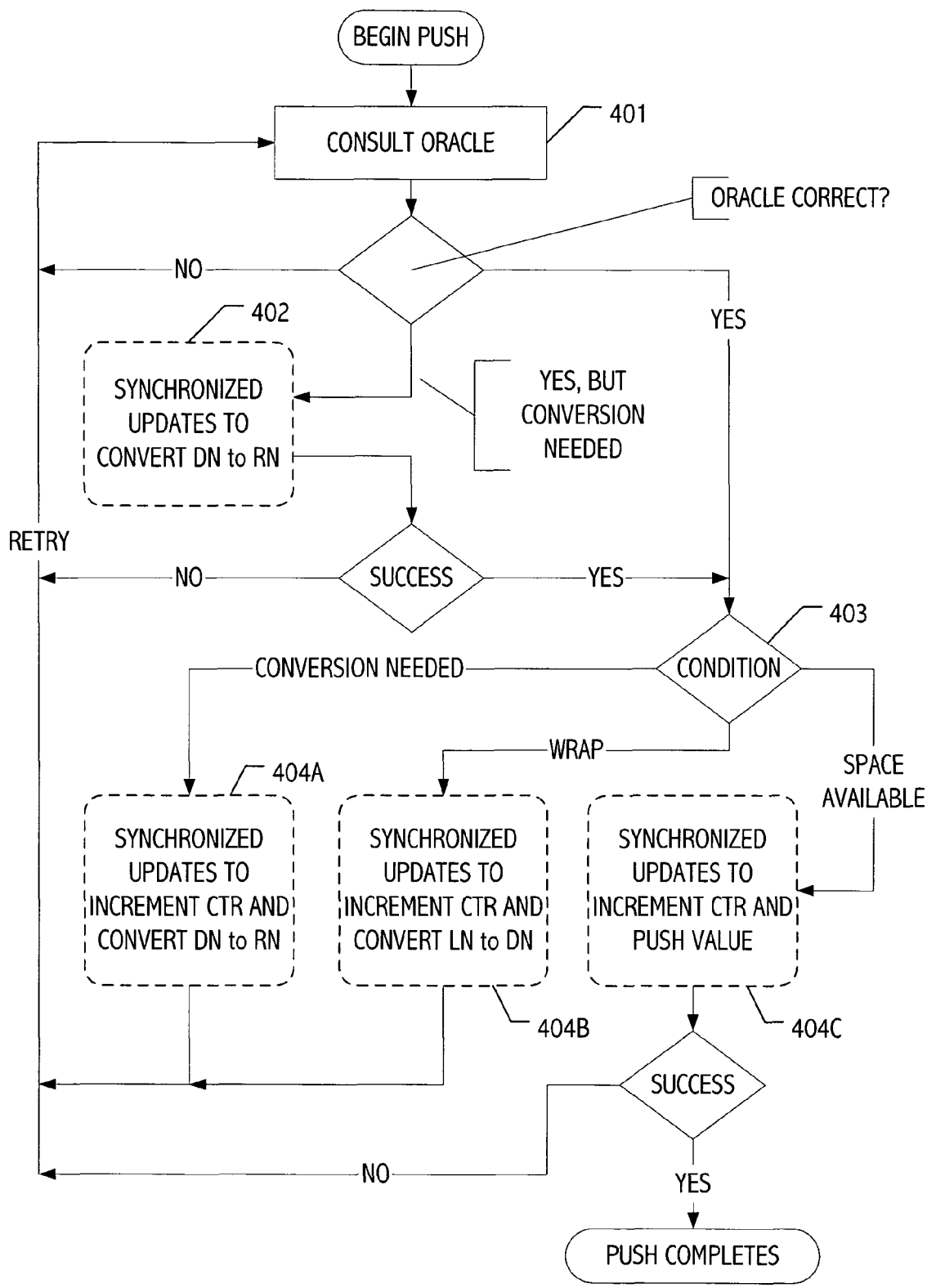
FIG. 4 illustrates a flow for an illustrative obstruction-free push operation on a wraparound deque in accordance with some techniques of the present invention.

FIG. 4 summarizes major flows in the operation of the rightpush( ) and rightcheckedoracle ( ) operations. As before, the implementation consults (401) an oracle, though this time, we check for the possibility that (though correct) the oracle returns a location with an adjacent DN value encoding to be converted. If so, the rightpush( ) operation employs a sequence of synchronization operations (at 402) to perform the DN to RN conversion. If successful (or if no DN conversion was required), the rightpush( ) operation attempts (as before) to increment an appropriate ctr field and to update a corresponding value field using a simple sequence of single-target (e.g., CAS-based) synchronization operations. As before, on failure, we simply retry. Though structurally quite similar to the simple example described above, our circular array algorithm does differentiate (at 403) between various conditions (space available, wrap, and DN-to-RN conversion needed) to perform the appropriate value update (e.g., at 404A, 404B or 404C) as part of the synchronization updates.

Because the array is circular, a rightpush( ) operation cannot determine whether the array is full by checking whether the returned index is at the end of the array. Instead, it ensures that there is space in the array by checking that A[k+1] val=RN. In that case, by the third invariant above, there are at least two null entries other than A[k] (which also contains RN), so the deque is not full. Otherwise, rightpush( ) first attempts to convert A[k] into an RN entry. We discuss how this conversion is accomplished below.

When a rightpush( ) operation finds only one RN entry, it tries to convert the next null entry—we know there is one by the third invariant above—into an RN. If the next null entry is an LN entry, then rightpush( ) first attempts to convert it into a DN entry. When doing this, rightpush( ) checks that cur.val=RN, which ensures there is at most one DN entry, as required by the second invariant above. If the next null entry is a DN entry, rightpush( ) will try to convert it into an RN entry, but only if the entry to the right of the one being converted (the nextnext entry) is an LN entry. In this case, it first increments the version number of the nextnext entry, ensuring the failure of any concurrent leftpush( ) operation trying to push a value into that entry. If the nextnext entry is a deque value, then the rightpush( ) operation checks whether the right end of the deque is still at k (by rereading A[k−1] and A[k]), and if so, the deque is full. If not, or if the nextnext entry is either an RN or DN entry, then some other operation is concurrent with the rightpush( ), and the rightpush( ) operation retries.

Assuming the invariants above, it is easy to see that this new algorithm is linearizable in exactly the same way as the algorithm in the previous section, except that a rightpush( ) operation that returns "full" linearizes at the point that nextnext is read (line RH11). Because we subsequently confirm (line RH13) that A[k−1] and A[k] have not changed since they were last read, we know the deque extends from A[k+2] to A[k−1] (with A[k−1] as its rightmost value), so that A[k] and A [k+1] are the only nonnull entries, and thus, the deque is full.

The main difficulty is verifying that when a rightpush( ) actually pushes the new value onto the deque (line RH5), either the next entry is an RN entry, or it is a DN entry and the nextnext entry is an LN entry. This is to ensure that after the push, there are still at least two null entries, one of which is an RN or DN entry. One key to the proof is to note that the value of an entry is changed only by lines R08, RH5, RH9, RH17, RP5, and their counterparts in the left-side operations. Furthermore, these lines only change an entry if the entry has not changed since it was most recently read. These lines are annotated with a description of how they change the value of the entry.

Time complexity. A simple measure of the time complexity of an obstruction-free algorithm (without regard to the particular contention manager and system assumptions) is the worst-case number of steps that an operation must take in isolation in order to be guaranteed to complete. For our algorithms, this is a constant plus the obstruction-free time complexity of the particular oracle implementation used.

Other Embodiments

The non-blocking, linearizable data structure implementation described herein may be provided as program code encoded on a computer readable storage medium, such as a disk, tape or other magnetic, optical, or electronic storage medium. The program code is executable on one or more processors to implement instantiating a double-ended array in memory and to implement opposing-end access operations that access a memory, provide concurrent push-type and pop-type access to at least one of the opposing ends of the array and concurrent, opposing-end accesses that are non-interfering for at least some states of the array, wherein concurrent execution of the access operations is mediated using a single-target synchronization primitive. The program code may be further executable to provide non-blocking access to a concurrent shared object. Similarly, the non-blocking deque implementation described herein may be provided as program code encoded on a computer readable storage medium executable by one or more processors to implement instantiating the deque in memory and to implement access operations to operate on state of the deque.

The description presented herein includes a set of techniques, objects, functional sequences and data structures associated with concurrent shared object implementations employing linearizable synchronization operations in accordance with an exemplary embodiment of the present invention. An exemplary non-blocking, linearizable concurrent double-ended queue (deque) implementation that employs compare-and-swap (CAS) operations is illustrative. As described, our implementation is obstruction-free. The deque is a good exemplary concurrent shared object implementation in that it involves all the intricacies of LIFO-stacks and FIFO-queues, with the added complexity of handling operations originating at both of the deque's ends. Accordingly, techniques, objects, functional sequences and data structures presented in the context of a concurrent deque implementation will be understood by persons of ordinary skill in the art to describe a superset of support and functionality suitable for less challenging concurrent shared object implementations, such as LIFO-stacks, FIFO-queues or concurrent shared objects (including deques) with simplified access semantics.

While the invention(s) is (are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. While much of description herein has focused on compare and swap (CAS) based synchronization, other synchronization primitives may be employed. For example, based on the description herein, persons of ordinary skill in the art will appreciate that other suitable constructs, including load-linked and store-conditional operation pairs (LL/SC) may be employed, as well. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computer readable storage medium encoding program code executable on one or more processors to implement:
   instantiating a data structure implementation in a memory comprising a double-ended array;
   executing a plurality of opposing-end access operations that, when executed on the one or more processors, access the memory, and provide concurrent push-type and pop-type access to at least one of the opposing ends and concurrent, opposing-end accesses that are non-interfering for at least some states of the array; and mediating concurrent execution of the access operations using a single-target synchronization primitive;
wherein the data structure implementation is linearizable and non-blocking, and
wherein the single-target of the single-target synchronization primitive includes a value encoding for an element of the array and a version number encoded integrally therewith.

2. The storage medium of claim 1, wherein the concurrent opposing-end access operations are non-interfering for all but boundary condition states of the array.

3. The storage medium of claim 1, wherein the non-blocking implementation is obstruction-free, though not wait-free or lock-free.

4. The storage medium of claim 1, wherein the single-target synchronization primitive employs a Compare-And-Swap (CAS) operation.

5. The storage medium of claim 1, wherein the single-target synchronization primitive employs a Load-Linked (LL) and Store-Conditional (SC) operation pair.

6. The storage medium of claim 1, wherein said mediating comprises attempting to increment the version number included in the single-target of the single-target synchronization primitive.

7. The storage medium of claim 1, wherein the double-ended array implements a deque.

8. The storage medium of claim 1, wherein the opposing-end access operations are at least consistent with semantics of a FIFO queue.

9. The storage medium of claim 1, wherein the boundary-condition states include an empty state.

10. The storage medium of claim 1, wherein the boundary-condition states include a single element state.

11. The storage medium of claim 1, wherein the array is indexable as a circular array.

12. The storage medium of claim 11, wherein the boundary-condition states include a full state.

13. The storage medium of claim 11, wherein the opposing-end accesses include opposing-end, push-type accesses; and
wherein the boundary-condition states include a nearly full state.

14. The storage medium of claim 1, wherein distinct left null and right null distinguishing values are employed to identify free elements of the array.

15. The storage medium of claim 14, wherein the array is indexed as a circular array; and
wherein an additional distinguishing value is employed to facilitate consumption of free elements by push-type operations at either end of the array.

16. The storage medium of claim 1, embodied as a software component combinable with program code to provide the program code with non-blocking access to a concurrent shared object.

17. The storage medium of claim 1, wherein the program code is further executable to provide non-blocking access to a concurrent shared object.

18. The storage medium of claim 1, comprising at least one medium selected from the set of a disk, tape or other magnetic, optical, or electronic storage medium.

19. A computer readable storage medium encoding program code executable on one or more processors to implement:
a single-target synchronization primitive based, non-blocking, fully functional deque implementation for which concurrent opposing-end access operations do not always interfere,
wherein shared storage usage of the deque implementation is insensitive to a number of access operations that concurrently access the deque.

20. The storage medium of claim 19, wherein the deque implementation is obstruction-free, though not wait-free or lock-free.

21. The storage medium of claim 19, wherein the concurrent opposing-end access operations are non-interfering for all but boundary condition states.

22. The storage medium of claim 19, wherein state of the deque is encoded using an array.

23. The storage medium of claim 22, wherein the array is a circular array.

24. The storage medium of claim 19, wherein the single-target synchronization includes use of a Compare-And-Swap (CAS) operation.

25. The storage medium of claim 19, wherein the single-target synchronization includes use of a Load-Linked (LL) and Store-Conditional (SC) operation pair.

26. The storage medium of claim 19, wherein at least some concurrently executed access operations interfere with each other; and
wherein the interfering concurrently executed access operations are each retried.

27. The storage medium of claim 26, wherein the non-blocking deque implementation does not guarantee that at least one of the interfering concurrently executed access operations makes progress.

28. The storage medium of claim 27, wherein a separate contention management facility is employed to ensure progress in a concurrent computation that employs the deque implementation.

29. The storage medium of claim 19, wherein the program code is executable to implement:
instantiating the deque in memory; and
executing access operations to operate on state of the deque.

30. A method of managing obstruction-free access to a shared double-ended array, the method comprising:
instantiating the double-ended array in memory; and
operating on state of the array using access operations that detect interference by other executions thereof using a single-target synchronization primitive; and
after detection of an interfering execution, retrying an interfered-with access operation,
wherein execution of respective ones of the access operations allow at least (i) concurrent push-type and pop-type access to at least one of the opposing ends and (ii) concurrent, opposing-end accesses that are non-interfering for at least some states of the array, and
wherein the single-target of the single-target synchronization primitive includes a value encoding for an element of the array and a version number encoded integrally therewith.

31. The method of claim 30, wherein the concurrent, opposing-end accesses are non-interfering for all but boundary-condition states of the array.

32. The method of claim 30,
wherein execution of the access operations is obstruction-free, though not wait-free or lock-free.

33. The method of claim 30,
wherein the single-target synchronization primitive employs a Compare-And-Swap (CAS) operation.

34. The method of claim 30,
wherein the single-target synchronization primitive employs a Load-Linked (LL) and Store-Conditional (SC) operation pair.

35. The method of claim 30,
wherein the double-ended array includes a representation of a deque; and
wherein the access operations include both push-type and pop-type access operations at both opposing ends of the deque.

36. The method of claim 30, further comprising:
a contention management facility facilitating progress of access operations.

37. The method of claim 36, further comprising:
changing, during the course of a computation involving the shared double-ended array, a contention management strategy employed by the contention management facility.

38. The method of claim 36,
wherein the contention management facility is separable from the single-target synchronization primitive.

39. The method of claim 30,
wherein progress is ensured not by the shared double-ended array, but rather by a separate contention management facility.

40. An apparatus, comprising:
one or more processors;
one or more data stores addressable by each of the one or more processors; and
means for coordinating concurrent non-blocking execution, by one or more of the processors, of at least opposing-end push-type and pop-type access operations on a fully functional deque data structure encoded in the one or more data stores, the coordinating employing a compare-and-swap (CAS) synchronization primitive to detect interference of concurrently executed ones of the access operations, the coordinating means ensuring that, for all but boundary-condition states of the deque, opposing-end accesses are non-interfering, wherein the target of the CAS synchronization primitive includes a value encoding for an element of the deque and a version number encoded integrally therewith.

41. The apparatus of claim 40,
wherein the coordinating means tolerates non-progress of interfering executions of the access operations.

42. The apparatus of claim 40, further comprising:
means for managing contention between interfering executions of the access operations.

43. A non-blocking method of operating on a double-ended queue data structure, the method comprising:
concurrently executing push-type and pop-type access operations to at least one of opposing ends of the double-ended queue;
detecting interference with a particular execution of one of the access operations using a single-target synchronization primitive; and
tolerating, in the implementation of the double-ended queue data structure, a possibility that two or more executions of the access operations interfere with each other and each consequently fail to make progress,
wherein the non-blocking property is achieved while ensuring that, for all but boundary-condition states of the deque, opposing-end accesses are non-interfering and without use of a multi-target synchronization primitive and
wherein the single-target of the single-target synchronization primitive includes a value encoding for an element of the double-ended queue and a version number encoded integrally therewith.

44. The method of claim 43, further comprising:
managing the possibility that access operations interfere with each other and consequently fail to make progress using a substitutable contention management facility separable from implementation of the double-ended queue data structure.

* * * * *